United States Patent

Makino et al.

[11] Patent Number: 5,888,462
[45] Date of Patent: Mar. 30, 1999

[54] METHOD OF SOLVENT EXTRACTION OF NICKEL SULFATE SOLUTIONS

[75] Inventors: Susumu Makino; Naoyuki Tsuchida; Masaki Imamura, all of Niihama; Kazuyuki Takaishi, Uma-gun; Yoshitomo Ozaki, Niihama, all of Japan

[73] Assignee: Sumitomo Metal Mining Co., Ltd., Tokyo, Japan

[21] Appl. No.: 67,019

[22] Filed: Apr. 28, 1998

[30] Foreign Application Priority Data

Apr. 30, 1997 [JP] Japan .................................. 9-126346

[51] Int. Cl.$^6$ ........................ C22B 23/00; B01D 11/00; C01B 17/00
[52] U.S. Cl. ........................................ 423/139; 423/544
[58] Field of Search .................... 423/139, 544; 210/634

[56] References Cited

U.S. PATENT DOCUMENTS

| | | | |
|---|---|---|---|
| 3,069,231 | 12/1962 | Hard et al. | 423/544 |
| 3,336,133 | 8/1967 | Funatsu et al. | 423/544 |
| 4,196,076 | 4/1980 | Fujimoto et al. | 423/139 |
| 4,600,435 | 7/1986 | Wiegers et al. | 423/139 |
| 4,900,522 | 2/1990 | Chou et al. | 423/139 |
| 4,956,154 | 9/1990 | Magdics et al. | 423/139 |
| 4,975,253 | 12/1990 | Monzyk et al. | 423/139 |
| 5,028,403 | 7/1991 | Rickelton et al. | 423/139 |
| 5,399,322 | 3/1995 | Coltrinari | 423/139 |
| 5,470,553 | 11/1995 | Hao-chung et al. | 423/139 |

FOREIGN PATENT DOCUMENTS

| | | | |
|---|---|---|---|
| 2453878 | 5/1975 | Germany | 423/139 |
| 53-10323 | 1/1978 | Japan | 423/139 |
| 54-112303 | 9/1979 | Japan | 423/139 |
| 58-79830 | 5/1983 | Japan | 423/544 |

*Primary Examiner*—Steven Bos
*Attorney, Agent, or Firm*—Watson Cole Grindle Watson, P.L.L.C.

[57] ABSTRACT

A method of solvent extraction of a nickel sulfate solution uses a multi-stage, counter-current, organic solvent extraction system composed of at least two extractors connected in series, and includes a first extraction step of feeding a crude nickel sulfate solution that contains sodium and ammonium impurities into a second-stage extractor, wherein it is treated in countercurrent flow and at a pH of 6.5 to 7.0 with an organic extractant fed into the second-stage extractor from the first-stage extractor, to thereby extract some of nickel in the crude nickel sulfate solution into the organic extractant; and a second extraction step of transferring the nickel-containing, organic phase to an organic phase-scrubbing step to remove sodium and ammonium, while transferring the nickel sulfate solution, from the first extraction step and from which some of nickel has been removed, to the first-stage extractor, wherein it is treated in countercurrent flow and at a pH of 5.5 to 6.5 with a fresh organic extractant, to thereby extend the remaining nickel in the nickel sulfate solution into the organic extractant. The nickel-containing organic phase from the second extraction step is divided into two portions, one portion being fed into the second-stage extractor while the other portion is transferred to a by-pass, organic phase-scrubbing step it to remove sodium and ammonium.

5 Claims, 1 Drawing Sheet

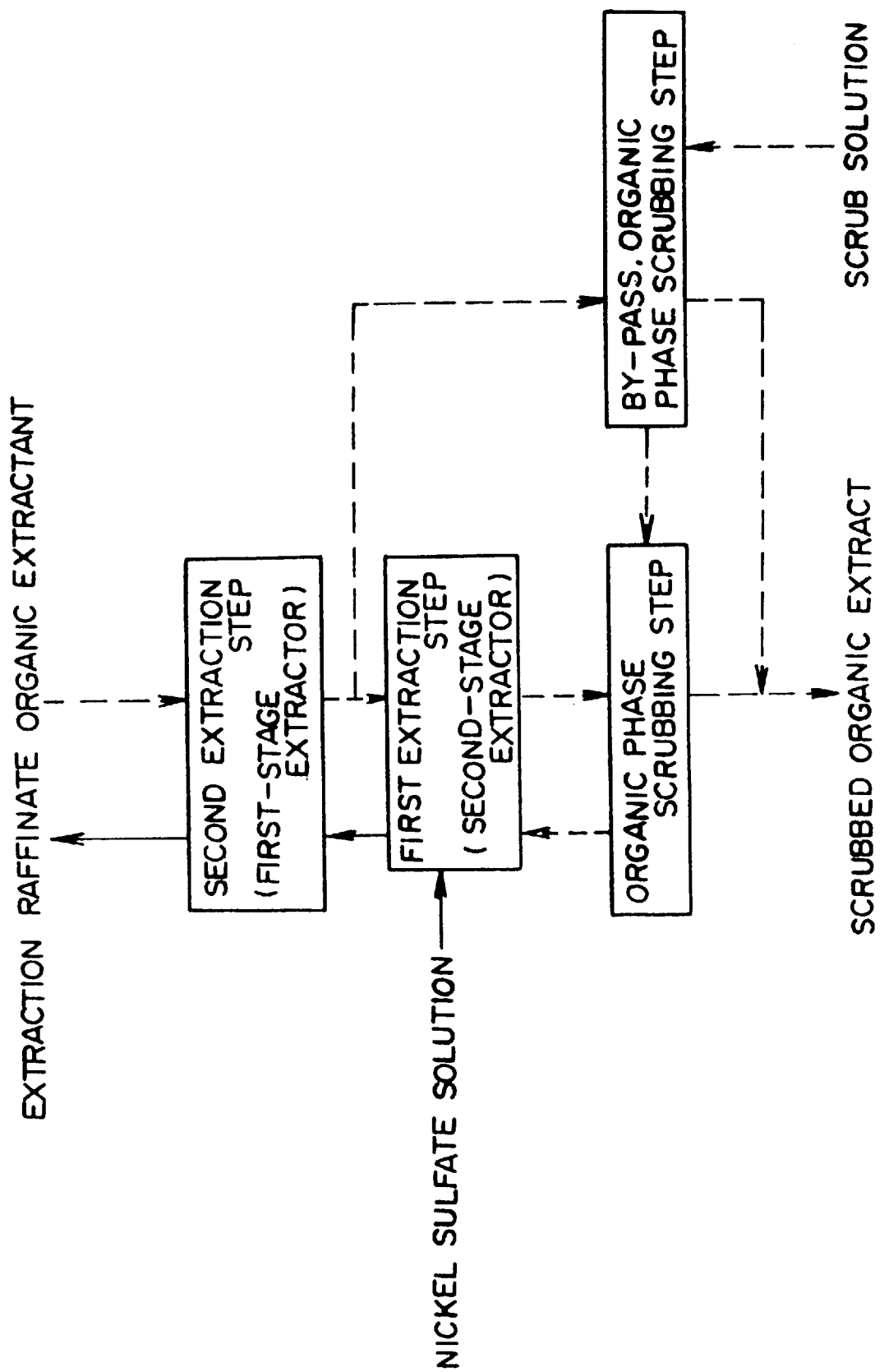

METHOD OF SOLVENT EXTRACTION OF NICKEL SULFATE SOLUTIONS

FIELD OF THE INVENTION

The present invention relates to a method of removing ammonia, sodium and other impurities from an aqueous solution of nickel using two-stage solvent extraction.

BACKGROUND OF THE INVENTION

Nickel sulfate is industrially used not only in ordinary electroplating but also in electroless nickel plating in producing computer hard discs. In addition, nickel sulfate has been recently used as the nickel material for secondary batteries.

For some of those uses, the amount of impurities such as ammonia, sodium, and others existing in a crude nickel sulfate solution must be reduced as much as possible. To purify nickel sulfate, organic solvent extraction has heretofore been employed. The method of organic solvent extraction using an acid extractant requires a neutralizer both for removing the impurities from the starting crude solution by extracting them into the extractant and for extracting nickel therefrom into the extractant. As the neutralizer, in general, sodium hydroxide is popularly used, as it is easy to handle. Using sodium hydroxide as the neutralizer, however, involves introduction of sodium into the organic phase. As a result, even when the purified nickel sulfate solution is concentrated to give crystals of nickel sulfate, it is extremely difficult to prevent the crystals from being contaminated with sodium.

More concretely, for example, in the conventional method of removing cobalt, calcium and other impurities from a crude nickel sulfate solution through solvent extraction using an acid extractant, an organic acid extractant such as an alkyl phosfonic acid or its ester is normally used. However, sodium of sodium hydroxide that is used as a pH-adjusting neutralizer will naturally remain in the organic phase, resulting in the crystals of nickel sulfate formed from the purified nickel sulfate solution containing sodium. On the other hand, when nickel is extracted from a crude nickel sulfate solution into such an organic acid extractant through solvent extraction, a large amount of sodium will be extracted into the organic phase. Even when the resulting extract is stripped with a mineral acid such as sulfuric acid, most of the sodium moves into the strip solution, resulting in the crystals of nickel sulfate obtained being contaminated with sodium.

Accordingly, in the solvent extraction method using an organic acid extractant for purifying nickel, the nickel-containing organic phase must be scrubbed completely to separate and remove the sodium component. However, this scrubbing is uneconomical and disadvantageous, as it requires a large amount of scrub solution and as the nickel loss in the scrub raffinate is great. In addition, the scrubbing is troublesome since it requires the treatment of the scrub raffinate.

SUMMARY OF THE INVENTION

The object of the present invention is to provide an advantageous method of purifying a nickel sulfate solution through solvent extraction in which sodium, ammonia and other impurities in the organic phase separated are economically removed to efficiently give a high-purity nickel sulfate solution.

The invention that attains the object as above is characterized by a method of solvent extraction of nickel sulfate which uses a two-stage, counter-current, organic solvent extraction system composed of two extractors connected in series, and which includes a first extraction step of feeding a crude nickel sulfate solution that contains impurities of essentially sodium and ammonium into a second-stage extractor, wherein the crude nickel sulfate solution is treated in countercurrent flow and at a pH of 6.5 to 7.0 with an organic extractant fed into the second-stage extractor from a first-stage extractor to thereby extract a part the nickel existing in the crude nickel sulfate solution into the organic extractant, and a second extraction step of transferring the nickel-containing, organic phase to an organic phase-scrubbing step of scrubbing it to remove sodium and ammonium from the thus-transferred, nickel-containing organic phase while transferring to nickel sulfate solution which has been processed in the first extraction step, and from which a part of the nickel has been removed, to the first-stage extractor wherein the thus-transferred crude nickel sulfate solution is treated in countercurrent flow with a fresh organic extractant pH range of 5.5 to 6.5 in a to thereby extract the remaining nickel still existing in the crude nickel sulfate solution into the organic extractant. The nickel-containing organic phase as separated in the second extraction step is divided into two portions, one portion being used as the organic extractant fed into the second-stage extractor while the other portion is transferred to a by-pass, organic phase-scrubbing step for removing sodium and ammonium from the thus-transferred, nickel-containing organic phase.

In the organic phase-scrubbing step in the method of the invention, it is preferable that the nickel-containing organic phase as separated in the first extraction step is scrubbed with scrub solution that contains nickel in an amount of at least 10 g/liter. In the by-pass, organic phase-scrubbing step therein, it is preferable that the nickel-containing organic phase as separated in the second extraction step is washed with scrub solution that contains nickel in an amount of at least 0.6 times the amount of nickel existing in the phase.

It is also preferable that at least a part of the wash waste as discharged in the by-pass, organic phase-scrubbing step is used as the scrub solution in the organic phase-scrubbing step.

BRIEF DESCRIPTION OF THE FIGURE

The accompanying FIGURE shows a flowchart of one preferred embodiment of the invention, in which nickel is extracted in a two-stage, counter-current extraction system.

DESCRIPTION OF PREFERRED EMBODIMENTS OF THE INVENTION

In solvent extraction using an organic acid extractant where nickel is extracted into the extractant from a crude nickel sulfate solution containing impurities of essentially sodium and ammonium, generally used is an alkyl phosphonic acid or its ester, such as CYANEX 272, D2EHPA, PC88A or the like, as the extractant. In this, it is desirable that the pH of the extractant is kept between 5 and 7 in consideration of the residual loss of nickel in the extraction residue. If the extraction is carried out at a pH higher than that raffinate, a large amount of sodium, ammonium and other impurities that may be extracted out into the extractant at a pH higher than the pH range suitable for nickel extraction and the removal of those impurities from the resulting organic phase is difficult. However, we, the present inventors have tried a specific two-stage extraction of a nickel sulfate solution using a specific two-stage, counter-current, organic solvent extraction system composed of two extractors connected in series, while transferring a part of the nickel-containing organic phase extracted in the system to a by-pass scrubbing step in which the thus-transferred extract is scrubbed to thereby remove sodium, ammonium and other impurities still existing in the phase, and have succeeded in efficiently removing those impurities from the nickel-containing organic phase.

As illustrated in the Figure, a crude nickel sulfate solution containing sodium, ammonium and other impurities is subjected to a two-stage counter-current extraction with an organic acid extractant in which at least two extractors connected in series are used, whereby almost all nickel existing in the starting, crude nickel sulfate solution is extracted out into the organic extractant. Precisely, in the first extraction step of the system, a starting, crude nickel sulfate solution is fed into the second-stage extractor in which the solution is processed in countercurrent fashion with an organic extractant fed thereinto from the first-stage reactor to thereby extract part of nickel existing in the crude nickel sulfate solution into the organic extractant.

In the second extraction step, the crude nickel sulfate solution, which has been processed in the first extraction step and from which some of the nickel has been removed, is transferred to the first-stage extractor, and is further processed therein with in countercurrent flow a fresh organic extractant to thereby extract the remaining nickel still existing in the crude nickel sulfate solution into the organic extractant. The nickel extraction in the second-stage extractor in the first extraction step is carried out in a pH range of 6.5 to 7.0, while that in the first-stage reactor in the second extraction step is carried out in a pH range of 5.5 to 6.5.

The pH in the second extraction step is defined to fall between 5.5 and 6.5, or that is, defined to be lower than the pH range in the first extraction step. This is because, in the second extraction step in which a smaller amount of nickel is extracted into the organic acid extractant, nickel is favorably extracted at a pH value lower than 6.5 while effectively preventing the extraction of sodium and ammonium into the organic extractant.

A part of the nickel-containing organic phase separated in the second extraction step and discharged out from the first-stage extractor is transferred to a by-pass, organic extract-scrubbing step, while the remaining part thereof is circulated to the second-stage extractor. This is because, within a relatively high pH range, for example, within a pH range of 6.5 or higher, the increase in the concentration of nickel being extracted into the organic extractant inhibits the extraction of sodium and ammonium into the organic extractant. Therefore, a part of the nickel-containing organic phase is transferred to the by-pass, organic extract-scrubbing step to thereby reduce the amount of the organic extractant to be fed into the second-stage extractor, and the nickel extraction is carried out in the second-stage extractor in a pH range of 6.5 to 7.0 whereby the nickel concentration in the organic phase as separated in the first extraction step is increased while reducing the amount of sodium, ammonium and other impurities that may be in the organic phase.

Specifically, in the method of the invention, a part of the organic phase separated in the second extraction step and discharged out from the first-stage extractor is transferred to the by-pass, organic phase-scrubbing step, while the remaining part thereof is circulated to the second-stage extractor. The method of the invention is better than any other conventional process not comprising such a specific circulation step in that the former produces two effects, one being a physical effect of reducing the amount of the organic extractant to be used in the two extraction steps in which the amount of impurities to be extracted into the extractant may increase, and the other being a chemical effect of increasing the nickel-concentration in the organic phase to thereby reduce the amount of impurities that may be in the extract.

The organic phase transferred from the first extraction step to the organic phase-scrubbing step, and a part of the organic phase transferred from the second extraction step to the by-pass, organic phase-scrubbing step are both scrubbed with a nickel-containing scrub solution in the respective steps, whereby the impurities of sodium and ammonium existing in those organic phases are substituted with nickel existing in the scrub solution, and are removed from the organic phase. We, the present inventors have found that, in order to enhance the substitution reaction, the nickel concentration in the scrub solution is preferably 0.6 times the nickel content of the organic phase, and is not smaller than 10 g/liter.

Where the organic phase is scrubbed under the defined condition, the scrub raffinate as discharged from the by-pass, organic phase-scrubbing step may be used as the scrub solution for scrubbing the organic phase leaving the first extraction step. This is because, since the organic phase transferred from the second extraction step to the by-pass, organic phase-scrubbing step is one processed with a relatively large amount of an organic extractant at a relatively low pH value for nickel extraction, it has a relatively low nickel-content falling between 1 and 5 g/liter or so, while containing sodium, ammonium and impurities in an amount of from 1 to 2 g/liter or so. Therefore, in this by-pass scrubbing step, nickel existing in the scrubbing solution used may be substituted with those impurities without greatly reducing the nickel-content of the resulting scrub raffinate, and the scrub raffinate from this by-pass scrubbing step can be used in the organic phase-scrubbing step where the organic phase from the first extraction step is scrubbed.

For example, where an organic phase containing sodium and ammonium impurities in an amount of 2 g/liter and having been transferred into the by-pass scrubbing step is scrubbed with an aqueous nickel sulfate solution having a nickel-content of 20 g/liter in a ratio of 1/1, the reduction in the nickel concentration in the scrub raffinate of the aqueous solution, due to the substitution reaction, may be at most about 2.5 g/liter, and the scrub raffinate from this by-pass scrubbing step still has a nickel-content of not smaller than 10 g/liter that may be well used as a scrubbing solution in the organic phase-scrubbing step. The impurity concentration in the scrub raffinate from the by-pass scrubbing step, which is used as the scrubbing solution in the organic phase-scrubbing step, shall increase in some degree, but does not interfere with the scrubbing with that scrub solution in the organic phase-scrubbing step since the substitution reaction between the impurities in the organic phase and nickel in the scrub solution occurs predominantly in the organic phase-scrubbing step.

Accordingly, in the method of the invention, sodium and ammonium can be effectively removed from the organic phase even when a small amount of a scrub solution is used as a whole. The nickel-containing scrub solution for use in the invention may be the purified nickel sulfate solution obtained from the organic phase separated through extraction in the invention, or may be prepared from nickel sulfate crystals obtained from the purified nickel sulfate solution.

In the illustrated embodiment of organic solvent extraction, being a counter-current extraction system which comprises two extractors connected in series, however, is not limitative. Apart from this, also employable herein is any other multi-stage extraction system comprising more than two extractors connected in series, in which nickel is extracted from a crude nickel sulfate solution in one or more intermediate-stage extractors, while a part of the organic phase from the previous extractor is transferred into a by-pass, organic phase-scrubbing step.

The invention will be described in more detail with reference to the following Examples, which, however, are not intended to restrict the scope of the invention.

EXAMPLE 1

Herein made was an experiment of nickel extraction from an aqueous phase containing nickel, sodium and ammonium into an organic acid extractant, using a two-stage, counter-current mixer-settler system including two mixer-settlers connected in series, in which the mixer zone of each mixer-settler had an effective capacity of 0.5 liters and the settler zone thereof had a capacity of 3.1 liters (mixer-settler is hereinafter referred to as settler), according to the method of the invention (Example of the invention) and to a conventional method (Comparative Example). This is to demonstrate how and to what degree sodium and ammonium are prevented from being extracted into the extractant.

The amount of the aqueous phase fed into the system was 1.3 liters/hr, and the amount of nickel fed into the aqueous phase was 38 g/hr while that of sodium fed thereinto was about 34 g/hr. The ammonia concentration in the aqueous phase was 1.0 g/liter. The organic acid extractant used herein was PC-88A (manufactured by Dai-hachi Chemical Co.) diluted with CLEANSOL G (manufactured by Nippon Petroleum Co.) to have a concentration of 20% (v/v), and its amount fed into the system was 2.6 liters/hr.

The organic extractant was fed into the first-stage settler, while the aqueous phase containing nickel, sodium and ammonium was into the second-stage settler, and the two were reacted in the settler of each stage in a manner of continuous counter-current extraction reaction. In this Example of the invention, a part of the organic phase separated in the first-stage settler was transferred to a by-pass scrubbing step at a flow rate of 1 liter/hr, while the other part was transferred to the second-stage settler at a flow rate of 1.6 liters/hr. Being different from this, in Comparative Example, all the organic phase separated in the first-stage settler was transferred to the second-stage settler in the manner of conventional solvent extraction.

The data of this Example of the invention, including the pH value, the flow rate, the nickel, sodium and ammonium concentration, the amount of sodium and ammonium as extracted into the organic extractant (sodium and ammonium contamination), and the amount of nickel as extracted into the organic extractant (nickel recovery) in each extraction stage, are shown in Table 1; and those of the Comparative Example are in Table 2.

TABLE 1

| Example of the Invention | pH | Flow Rate (liter/hr) | Ni (g/liter) | Na (g/liter) | $NH_3$ (g/liter) | Ni Recovery (%) | Na Contamination (%) | $NH_3$ Contamination (%) |
|---|---|---|---|---|---|---|---|---|
| Organic Phase in 1st-stage settler | 5.5 | 2.56 | 1.90 | 0.96 | 0.08 | — | 3.0 | 8.0 |
| Aqueous Phase in 1st-stage settler | | 1.63 | 0.55 | 16.8 | 0.44 | 97.6 | — | — |
| Organic Phase in 2nd-stage settler | 7.0 | 1.6 | 22.4 | 1.08 | 0.05 | — | 5.2 | 15.5 |
| Aqueous Phase in 2nd-stage settler | | 1.3 | 3.61 | 2.11 | 0.58 | — | — | — |

TABLE 2

| Comparative Example | pH | Flow Rate (liter/hr) | Ni (g/liter) | Na (g/liter) | $NH_3$ (g/liter) | Ni Recovery (%) | Na Contamination (%) | $NH_3$ Contamination (%) |
|---|---|---|---|---|---|---|---|---|
| Organic Phase in 1st-stage settler | 5.5 | 2.56 | 2.00 | 0.86 | 0.06 | — | — | — |
| Aqueous Phase in 1st-stage settler | | 1.64 | 0.57 | 15.0 | 0.34 | 97.6 | — | — |
| Organic Phase in 2nd-stage settler | 7.0 | 2.56 | 14.6 | 2.01 | 0.12 | — | 15.7 | 29.4 |
| Aqueous Phase in 2nd-stage settler | | 1.3 | 3.80 | 2.12 | 0.44 | — | — | — |

In the Example of the invention, the amount of nickel in the aqueous phase fed into the system was 29 g/liter, and the amount of nickel in the extraction raffinate was reduced to 0.55 g/liter as a result of the counter-current, two-stage extraction. In other words, the nickel recovery was 97.6% as in Table 1. The amount of sodium that contaminated the final organic phase was 3.0%, which was in the by-pass organic phase, and 5.2%, which was in the organic phase from the second-stage settler, totaling 8.2%. The amount of ammonia contaminating the same totaled 23.5%.

On the other hand, in the Comparative Example of the conventional counter-current, two-stage extraction with no by-pass step, the nickel extraction was 97.6% as in Table 2, which is the same as that in the Example of the invention, but the amount of sodium and ammonium contaminating the final organic phase was 15.7% and 29.4, respectively. Thus, it is obvious that the amount of sodium and ammonium that contaminated the final organic phase was smaller in the Example of the invention than that in Comparative example. This shows the significant effect of the invention in preventing contamination of the organic phase with sodium and ammonia.

EXAMPLE 2

Using the same system and according to the same process as in Example 1, herein made was another experiment according to the method of the invention (Example of the invention) and to a conventional method (Comparative Example). This is to demonstrate the influence of the flow rate of the aqueous phase fed into the system on the nickel recovery and on the sodium and ammonium contamination.

In this experiment, the amount of nickel, sodium and ammonium fed into the settler was the same as that in Example 1, but the amount of the aqueous phase fed thereinto was 2.3 liters/hr or 3.31 liter/hr, which was larger than that in Example 1. The other conditions for this experiment were the same as those in Example 1, and the data were obtained also in the same manner as in Example 1 except that the pH of the aqueous phase was measured herein. The data of Example of the the invention are shown in Table 3, and those of the Comparative Example are in Table 4.

improved the removal of sodium and ammonium. In particular, in the Example of the invention, the total sodium and the total ammonium contaminating the by-pass organic phase and the second-stage organic phase were 5.1% and 10.7%, respectively, which were much smaller than those in the Comparative Example.

In another experiment, the amount of the aqueous phase fed into the first-stage settler was varied to 3.31 liters/hr, and the other conditions were the same as above. The data of this experiment are shown in Table 5.

TABLE 3

| Example of the Invention | pH | Flow Rate (liter/hr) | Ni (g/liter) | Na (g/liter) | $NH_3$ (g/liter) | Ni Recovery (%) | Na Contamination (%) | $NH_3$ Contamination (%) |
|---|---|---|---|---|---|---|---|---|
| Organic Phase in 1st-stage settler | | 2.56 | 2.23 | 0.62 | 0.06 | — | 1.92 | 5.56 |
| Aqueous Phase in 1st-stage settler | 5.5 | 2.63 | 0.52 | 10.8 | 0.31 | | | |
| Organic Phase in 2nd-stage settler | | 1.56 | 21.8 | 0.65 | 0.03 | 96.4 | 3.17 | 5.15 |
| Aqueous Phase in 2nd-stage settler | 7.0 | 2.30 | 2.77 | 9.92 | 0.37 | | | |

TABLE 4

| Comparative Example | pH | Flow Rate (liter/hr) | Ni (g/liter) | Na (g/liter) | $NH_3$ (g/liter) | Ni Recovery (%) | Na Contamination (%) | $NH_3$ Contamination (%) |
|---|---|---|---|---|---|---|---|---|
| Organic Phase in 1st-stage settler | | 2.56 | 2.34 | 0.57 | 0.05 | — | — | |
| Aqueous Phase in 1st-stage settler | 5.5 | 2.63 | 0.57 | 10.0 | 0.26 | | | |
| Organic Phase in 2nd-stage settler | | 2.56 | 14.1 | 1.25 | 0.08 | 96.0 | 10.0 | 21.2 |
| Aqueous Phase in 2nd-stage settler | 7.0 | 2.30 | 2.87 | 8.98 | 0.31 | | | |

From the data in Tables 3 and 4, it is seen that, in both Example of the invention and Comparative Example, the increase in the amount of the aqueous phase fed into the settler resulted in slight decrease in the nickel recovery but

TABLE 5

| Example of the Invention | pH | Flow Rate (liter/hr) | Ni (g/liter) | Na (g/liter) | NH$_3$ (g/liter) | Ni Recovery (%) | Na Contamination (%) | NH$_3$ Contamination (%) |
|---|---|---|---|---|---|---|---|---|
| Organic Phase in 1st-stage settler | | 2.56 | 0.57 | 0.45 | 0.04 | | 1.4 | 4.23 |
| Aqueous Phase in 1st-stage settler | 5.5 | 3.62 | 2.31 | 7.85 | 0.23 | | | |
| Organic Phase in 2nd-stage settler | | 1.56 | 21.0 | 0.46 | 0.03 | 94.7 | 2.23 | 4.58 |
| Aqueous Phase in 2nd-stage settler | 7.0 | 3.30 | 2.33 | 6.92 | 0.27 | | | |

As in Table 5, when the amount of the aqueous phase fed into the first-stage settler was increased while the other conditions were not varied, the total sodium and the total ammonium contaminating the organic phase were 3.6% and 8.8%, respectively, which were further lower than those in Table 4, but the nickel recovery decreased with the increase in the amount of the aqueous phase fed into the settler. The series of these experiments made herein verifies that the nickel recovery greatly depends on the pH in the extraction reaction, especially on the pH in the first-stage settler. That is, it verifies that, when the pH of the aqueous phase in the first-stage settler is lowered to 5.5 so that the first-stage extraction is carried out such a low pH value, the nickel recovery is greatly lowered.

EXAMPLE 3

Using the same system and according to the same process as in the Example 1, except that the amount of nickel fed to the system was varied to 37 g/liter and that the pH in the first-stage settler was varied to 6.0, 6.5 or 7.0, herein made was still another experiment according to the method of the invention (Example of the invention) and to a conventional method (Comparative Example). This is to demonstrate the influence of the pH value in the settler on the nickel recovery and on the sodium contamination. The data obtained are shown in Table 6.

TABLE 6

| pH in 1st-stage settler | Example of the Invention | | Comparative Example | |
|---|---|---|---|---|
| | Ni Recovery (%) | Na Contamination (%) | ni Recovery (%) | Na Contamination (%) |
| 6.0 | 99.4 | 11.5 | 99.4 | 15.8 |
| 6.5 | 99.9 | 19.4 | 99.9 | 16.0 |
| 7.0 | 100 | 23.2 | 100 | 16.0 |

From the data in Table 6, it is seen that the increase in the pH value resulted in the increase in the nickel recovery in both the Example of the invention and the Comparative Example, while resulting in the great increase in the sodium contamination only in the Example of the invention but not in the Comparative Example. This is because, since the pH in the second-stage settler in this experiment was set at 7.0 like in the other experiments, the sodium contamination in the Comparative Example where the organic phase from the first-stage settler was not transferred to the by-pass step greatly depended on the pH value in the second-stage settler and was therefore not changed so much, while, in the Example of the invention where a part of the organic phase from the first-stage settler was transferred to the by-pass step, the pH value in the first-stage settler had a great influence on the sodium contamination, resulting in that the sodium contamination in the Example of the invention would have increased with the increase in the pH value in the first-stage settler.

However, the data in Example 2 indicate that the sodium contamination in the organic phase from the first-stage settler decreases with the increase in the aqueous phase as fed into the settler. Having noted this, we carried out another experiment where the flow rate of the aqueous phase into the first-stage settler was increased up to 3.3 liters/hr but the other conditions including the amount of nickel fed into the system were the same as above. The data of this experiment are shown in Table 7.

TABLE 7

| | Example of the Invention | | | Comparative Example | | |
|---|---|---|---|---|---|---|
| pH in 1st-stage settler | Ni Recovery (%) | Na Contamination (%) | NH$_3$ Contamination (%) | Ni Recovery (%) | Na Contamination (%) | NH$_3$ Contamination (%) |
| 6.0 | 98.6 | 5.5 | 10.3 | 98.4 | 7.3 | 16.2 |
| 6.5 | 99.8 | 10.7 | 14.1 | 99.8 | 7.4 | 16.4 |
| 7.0 | 99.8 | 13.6 | 18.9 | 99.9 | 7.4 | 16.3 |

From the data in Table 7, it is seen that an increase in the flow rate of the aqueous phase fed into the system resulted in the decrease in the sodium and ammonium contamination in the organic phase, as in Table 3, while the sodium contamination and also the ammonium contamination in the organic phase was not influenced by the pH change in the first-stage settler, as in Table 6. However, it is seen further seen therefrom that, in the Example of the invention, the sodium contamination in the organic phase decreased with an increase in the flow rate of the aqueous phase, as in the Comparative Example, but increased only a little with the increase in the pH value in the first-stage settler. That is, the increase in the sodium contamination in the Example of the invention was much lowered in this experiment. This means that, in the Example of the invention, if the pH in the first-stage settler is lowered to be not higher than 6.5, preferably to fall between 5.5 and 6.5, the impurity contamination in the organic phase can be totally reduced more than in the Comparative Example.

EXAMPLE 4

Herein made was an experiment to demonstrate the influence of the nickel-concentration in the scrub solution on the removal of sodium from organic extracts. In this experiment, 200 ml of an organic phase and 200 ml of nickel-containing scrub solution were stirred for 10 minutes until phase equilibrium. The nickel and sodium concentration in the organic phase used herein was controlled by reacting the same organic extractant as in Example 1 with a solution of nickel sulfate at a pH of 6.5 to 7.5. Sodium hydroxide was used as the neutralizer to control the sodium concentration in the organic phase. Prior to the phase equilibrium in the mixture of the organic phase and the scrub solution, the nickel-concentration in the scrub solution was controlled with nickel sulfate ($NiSO_4$) added thereto, while the sodium concentration therein was with sodium sulfate ($Na_2SO_4$) also added thereto. Table 8 shows various phase-equilibrated conditions of the organic phase and the scrub solution both having a varying nickel-concentration and a varying sodium concentration.

TABLE 8

| Ni Ratio (A/O) | Organic Phase | | Aqueous Phase | | Na Distribution (O/A) |
|---|---|---|---|---|---|
| | Ni (g/liter) | Na (g/liter) | Ni (g/liter) | Na (g/liter) | |
| 0.04 | 15.1 | 1.38 | 0.58 | 5.51 | 0.25 |
| 0.58 | 12.6 | 0.51 | 7.36 | 7.97 | $6.4 \times 10^{-2}$ |
| 0.89 | 12.5 | 0.007 | 10.3 | 0.168 | $4.2 \times 10^{-2}$ |
| 1.32 | 12.4 | 0.001 | 16.4 | 0.022 | $4.5 \times 10^{-2}$ |
| 0.34 | 23.6 | 0.037 | 8.08 | 0.522 | $7.1 \times 10^{-2}$ |
| 0.60 | 19.4 | 0.019 | 11.6 | 0.945 | $2.0 \times 10^{-2}$ |
| $1.3 \times 10^{-3}$ | 7.64 | 5.66 | 0.010 | 6.59 | 0.86 |
| $7.0 \times 19^{-2}$ | 8.58 | 4.93 | 0.060 | 16.0 | 0.31 |

From Table 8, it is seen that the nickel ratio (A/O) in the phase-equilibrated system greatly depends on the sodium distribution (O/A). This means that, in the phase-equilibrated condition, if the nickel-concentration in the aqueous phase is 0.6 times (A/O) that in the organic phase and if the nickel-content of the aqueous phase is not smaller than 10 g/liter, the removal of sodium from the organic phase is promoted.

EXAMPLE 5

Based on the data obtained in the series of experiments made hereinabove, we made herein a pilot test of two-stage counter-current extraction of the present invention, using the same two-stage counter-current mixer-settler system as in Example 1 and according to the flowchart illustrated in the Figure. Table 9 shows the composition of the crude nickel sulfate solution processed herein and the composition of the scrub solution herein. As the organic acid extractant, used PC-88A was used.

TABLE 9

| Element (g/liter) | Crude Nickel Solution | Sulfate Scrub Solution |
|---|---|---|
| Ni | 55.7 | 18.0 |
| Cu | 0.61 | — |
| Zn | 0.78 | — |
| Ca | 0.75 | — |
| $NH_3$ | 3.3 | — |
| Na | 6.7 | 0.01 |

The flow rate of the nickel sulfate solution fed to the second-stage settler was 0.3 liters/hr, and that of the organic extractant fed into the first-stage settler was 2.6 liters/hr. The pH in the first extraction step (in the second-stage settler) was 7.0, and that in the second extraction step (in the first-stage settler) was 5.5. The flow rate of the organic phase transferred into the by-pass step from the second extraction step (that is, from the first-stage settler) was 1.6 liters/hr.

Two mixer-settlers were provided for the by-pass scrubbing step of scrubbing the organic phase from the second extraction step and for the scrubbing step of scrubbing the organic phase from the first extraction step, and the flow rate of the scrub solution introduced into those was 1.0 liter/hr. Countercurrent solvent extraction of nickel was carried out according to the in method of the invention, and the data of the test are shown in the Table 10. Apart from this, another test of conventional, two-stage, counter-current solvent extraction of nickel (Comparative Example) was carried out under the same condition as above except that the nickel-concentration in the starting nickel sulfate solution was 56.5 g/liter, the nickel concentration in the scrub solution was 17.6 g/liter, and no by-pass scrubbing was effected. The data of the Comparative Example are shown in Table 11. In the Comparative Example, no by-pass scrubbing of the organic phase from the second extraction step was carried out. In this, therefore, the settler for the by-pass scrubbing was not provided.

TABLE 10

| Liquid in each step (g/liter) | Ni | Cu | Zn | Ca | $NH_3$ | Na |
|---|---|---|---|---|---|---|
| Extraction Raffinate | 0.52 | <0.001 | <0.001 | <0.001 | 0.44 | 18.8 |
| Organic Phase | 16.9 | 0.11 | 0.15 | 0.14 | 0.05 | 1.08 |
| Organic Phase in By-pass Step | 1.90 | <0.001 | <0.001 | 0.01 | 0.08 | 0.96 |
| Scrubbed Organic Phase | 19.7 | 0.11 | 0.15 | 0.15 | 0.002 | 0.002 |
| Scrub Raffinate | 12.2 | <0.001 | <0.001 | <0.001 | 0.78 | 2.53 |
| By-pass Scrubbed Organic Phase | 3.13 | <0.001 | <0.001 | 0.01 | 0.008 | 0.003 |

TABLE 11

| Liquid in each step (g/liter) | Ni | Cu | Zn | Ca | $NH_3$ | Na |
|---|---|---|---|---|---|---|
| Extraction Raffinate | 0.58 | <0.001 | <0.001 | <0.001 | 0.34 | 17.6 |
| Organic Phase | 9.84 | 0.11 | 0.15 | 0.14 | 0.12 | 5.10 |
| Scrubbed Organic Phase | 13.3 | 0.11 | 0.15 | 0.15 | 0.007 | 0.015 |
| Scrub Raffinate | 8.15 | <0.001 | <0.001 | <0.001 | 0.30 | 2.53 |

As is obvious from the data in Table 10 and Table 11, the nickel recovery was almost the same in the Example of the invention and in Comparative Example, but the sodium and ammonium contamination in the organic phase obtained in the Example of the invention greatly differs from that obtained in the Comparative Example. Precisely, based on the nickel-content (100%) of the nickel sulfate separated from the organic phase, the sodium content and the ammonium content of the organic phase were both not larger than 100 ppm in the Example of the invention, but were larger than 1000 ppm and larger than 500 ppm, respectively, in the Comparative Example. Even though the crystallization of nickel sulfate from the organic phase is taken into consideration, it is obvious that the process of Comparative Example requires an increased amount of scrub solution in the scrubbing step and requires a large amount of nickel to be put in the scrubbing solution in order to promote the scrubbing of the organic phase.

As has been described in detail hereinabove, according to the method of the present invention for solvent extraction of nickel with an organic acid extractant, the sodium and ammonium contamination in the organic phase obtained is much reduced with ease, and, in addition, the amount of scrub solution to be used for scrubbing the organic phase can be reduced significantly. Thus, the method of -the invention has the advantage of being economical in industrial purification of nickel sulfate.

While the invention has been described in detail and with reference to specific embodiments thereof, it will be apparent to one skilled in the art that various changes and modifications can be made therein without departing from the spirit and scope thereof.

What is claimed is:

1. A method of solvent extraction of nickel sulfate which uses a two-stage, counter-current, organic solvent extraction system composed of two extractors connected in series, and which comprises a first extraction step of feeding a crude nickel sulfate solution that contains impurities of essentially sodium and ammonium into a second-stage extractor wherein the crude nickel sulfate solution is treated in counter-current flow and at a pH of 6.5 to 7.0 with an organic extractant fed into the second-stage extractor from the first-stage extractor to thereby extract a part of the nickel in the crude nickel sulfate solution into the organic extractant; and a second extraction step of transferring the nickel-containing, organic phase to an organic phase-scrubbing step to remove sodium and ammonium from the thus-transferred, nickel-containing organic phase, while transferring the crude nickel sulfate solution which has been processed in the first extraction step and from which a part of the nickel has been removed to the first-stage extractor wherein the thus-transferred crude nickel sulfate solution is treated in counter-current flow and at a pH of 5.5 to 6.5 with fresh organic extractant to extract the remaining nickel in the crude nickel sulfate solution into the organic extractant; and in which the nickel-containing organic phase as separated in the second extraction step is divided into two portions, one portion being fed into the second-stage extractor while the other portion is transferred to a by-pass, organic phase-scrubbing step wherein sodium and ammonium are removed from the thus-transferred, nickel-containing organic phase to provide a scrub raffinate.

2. The method of solvent extraction of nickel sulfate as claimed in claim 1, wherein in said organic phase scrubbing step the nickel-containing organic phase is scrubbed with a scrub solution that contains nickel in an amount of at least 10 g/liter.

3. The method of solvent extraction of nickel sulfate as claimed in claim 1, wherein in said by-pass, organic phase-scrubbing step the nickel-containing organic phase is scrubbed with a scrub solution that contains nickel in an amount of at least 0.6 times the amount of nickel existing in said phase.

4. The method of solvent extraction of nickel sulfate as claimed in claim 1, wherein in the organic phase-scrubbing step the nickel-containing organic phase is scrubbed with at least a part of the scrub raffinate.

5. A method of solvent extraction of a nickel sulfate solution using a second-stage extractor and a first-stage extractor which comprises the steps of:

(a) flowing a crude nickel sulfate solution containing sodium and ammonium impurities first through said second-stage extractor and then through said first-stage extractor while flowing organic extractant first through said first-stage extractor and then through said second-stage extractor in counter-current flow relative to said crude nickel sulfate solution, (b) maintaining a pH of 6.5 to 7.0 in said second-stage extractor so that nickel, sodium and ammonium are removed from said crude nickel sulfate solution into said organic extractant, (c) maintaining a pH of 5.5 to 6.5 in said first-stage extractor so that nickel, sodium and ammonium are removed from said crude nickel sulfate solution into said organic extractant, (d) separating a part flow of said organic extractant leaving said first-stage extractor and contacting said part flow with a scrub solution to remove sodium and ammonium from said part flow and provide a scrub raffinate, and (e) contacting organic extractant leaving said second-stage extractor with said scrub raffinate to remove sodium and ammonium from said organic extractant.

* * * * *